United States Patent
Austen et al.

(10) Patent No.: US 6,511,223 B1
(45) Date of Patent: Jan. 28, 2003

(54) CONVEYOR OVEN PROFILER WITH SIMPLIFIED TEMPERATURE SENSOR CONNECTION SCHEME

(75) Inventors: Paul M. Austen, Milwaukie, OR (US); Rex L. Breunsbach, Clackamas, OR (US)

(73) Assignee: Electronic Controls Design, Inc., Milwaukie, OR (US)

(*) Notice: Subject to any disclaimer, the term of this patent is extended or adjusted under 35 U.S.C. 154(b) by 13 days.

(21) Appl. No.: 09/710,223

(22) Filed: Nov. 10, 2000

(51) Int. Cl.[7] .............................. G01K 1/14; G01K 3/04; G01K 3/06; G01K 7/04; G08C 17/02
(52) U.S. Cl. ...................... 374/166; 374/137; 374/142; 374/149; 374/179; 219/388
(58) Field of Search ..................... 374/166, 137, 374/149, 142, 141, 179, 208; 219/388

(56) References Cited

U.S. PATENT DOCUMENTS

| | | | |
|---|---|---|---|
| 4,180,199 A | * 12/1979 | O'Rourke et al. | 340/870.17 |
| 4,217,634 A | * 8/1980 | Dalley et al. | 324/119 |
| 4,718,776 A | * 1/1988 | Gilland et al. | 374/149 |
| 4,982,347 A | * 1/1991 | Rackerby et al. | 374/137 |
| 5,003,160 A | * 3/1991 | Matsuo et al. | 219/388 |
| 5,161,889 A | * 11/1992 | Smith et al. | 374/29 |
| 5,505,544 A | * 4/1996 | Hunt | 374/166 |
| 5,511,415 A | * 4/1996 | Nair et al. | 374/142 |
| 5,739,443 A | * 4/1998 | Saunders | 374/208 |
| 5,792,951 A | * 8/1998 | Ismail et al. | 374/142 |
| 6,062,728 A | * 5/2000 | Breunsbach et al. | 374/166 |

OTHER PUBLICATIONS

KIC Application Note #00121 Rev: 98–06, "Profiling Using the SlimKIC," downloaded Aug. 7, 2002 from http://www.kicthermal.com, pp. 1–9, (1998).*

KIC Application Note #00001 Rev: 98–05, "Attaching Thermocouples for Solder Reflow Board Profiling Using High Temperature Solder," downloaded Aug. 7, 2002 from http://www.kicthermal.com, pp. 1–4, (1998).*

O'Rourke, H. T.; "Controlling wave soldering through the use of time/temperature instrumentation," Insulation Circuits (USA), vol. 24, No. 11, pp. 27–29, Oct. 1978.*

"The Temperature Handbook," vol. 29, Omega Engineering, Stamford, CT, (no month) 1995, pp. S–145.*

"The Temperature Handbook," vol. 29, Omega Engineering, Stamford, CT, (no month) 1995, pp. G–42, G–43, G–45, G–59.*

* cited by examiner

*Primary Examiner*—Diego Gutierrez
*Assistant Examiner*—Stanley J. Pruchnic, Jr.
(74) *Attorney, Agent, or Firm*—Klarquist Sparkman, LLP

(57) ABSTRACT

A sensor link is disclosed that simplifies connections between multiple temperature sensors positioned on a test board and a data logger that stores temperature information received from the temperature sensors while passing through the conveyor oven. In one embodiment, the sensor link includes multiple input ports for connecting to the temperature sensors. Conductors within the sensor link connect the multiple temperature sensors to an output port. In one aspect, a single cable extends between the sensor link and a data logger. The data logger stores temperature information received from the temperature sensors while the test board is passed through a conveyor oven. The sensor link can also have additional temperature sensors for providing additional temperature information about the conveyor oven. For example, an ambient temperature sensor may be positioned on the sensor link to provide the ambient temperature of the conveyor oven. A metal mass may also be positioned on the sensor link for providing heat flow information about the conveyor oven. Once all of the desired information is stored in the data logger, such information can be downloaded to a computer for further processing, such as obtaining a profile of the conveyor oven.

24 Claims, 6 Drawing Sheets

CONVEYOR OVEN PROFILER WITH SIMPLIFIED TEMPERATURE SENSOR CONNECTION SCHEME

FIELD OF THE INVENTION

This invention pertains to components used with test equipment for sensing, collecting and analyzing physical parameters associated with a conveyor oven. More particularly, the invention pertains to an apparatus and method for simplifying the connection of wires from temperature sensors and/or for providing additional oven profiling information, such as ambient air temperature and heat flow.

BACKGROUND

Conveyor ovens (also called furnaces) are used in a variety of industries including the electronics, baking, and painting industries. Generally, conveyor ovens have multiple heating zones through which products pass. The heating zones are thermally isolated from each other by air curtains or other means. Such thermal isolation allows each zone to be maintained at a temperature that differs from other zones in the oven. A particular advantage of conveyor ovens with multiple heating zones is that the products can be heated to different temperatures at different times as they pass through the oven. In all industries that use conveyor ovens, it is important that the ovens behave consistently over time. However, after extended use, the ovens tend to change in performance. Some causes of this change include dust accumulating on oven blowers and/or process bib-products, such as fluxes, accumulating on blowers or blocking exhaust ports.

In the electronics industry, conveyor ovens are used to mount integrated circuits and other electronic components to printed circuit boards (PCBs). The multiple heat zones allow the oven to control changes in temperature to prevent thermal stress to the components on the PCB and to meet temperature profile requirements for the flux/paste. Prior to running it through the oven, solder paste is placed on the PCB at predetermined points where components are to be mounted. As the PCB passes through the heat zones, the solder melts, bonding the components to the PCB. Conventionally, prior to a production run, a large number of test PCBs (also called test boards) of the same type were passed through the oven under different heating conditions to ensure the temperature profile of the oven matched the requirements of the components and flux. Each PCB was analyzed after its pass and the best setting for the oven was determined based on this analysis. This test process resulted in a significant number of test boards being scrapped due to improper heating or overuse. Other industries using conveyor ovens have experienced similar problems in setting the ovens for a production run.

To better determine optimal temperature settings and maintain existing or known settings without the need for multiple test boards, electronic data loggers (also called data collectors or monitors) have been developed that attach to a test PCB. One such data logger, the M.O.L.E.® temperature profiler, is an oven profiler sold commercially by Electronic Controls design, Inc., of Milwaukie, Oreg. Beyond the M.O.L.E., the test PCB has various thermocouples strategically placed thereon. Traditionally, each thermocouple is connected directly to the electronic data logger. The electronic data logger is physically spaced apart from the PCB so as not to absorb heat in the vicinity of the PCB that can result in inaccurate temperature profiling. The data logger stores temperature information provided from the thermocouples, which information can be processed to determine and control the optimal temperature profile of the oven.

This method of collecting data, however, results in multiple connections between the data logger and the thermocouples that can make handling the combined logger/test board apparatus unwieldy. For example, each thermocouple is associated with a dissimilar wire pair connected to the data logger. A typical application may have 6 or more wire pairs extending between the data logger and a PCB containing the thermocouples. The long length and large number of wires often results in the wires becoming tangled and/or unmanageable. Additionally, it is difficult to determine which wire is connected to which sensor increasing the chance for a connection error. The wires may also dangle and catch on the oven as they pass therethrough.

An object of the invention, therefore, is to provide an apparatus to better manage the connection of sensors to a data logger. A further object is to gather and analyze reliable parameters relating to oven temperature and efficiency.

SUMMARY

The present invention is directed to a sensor link that attaches to a test PCB used for profiling a conveyor oven. The sensor link is positioned intermediate the thermocouples on the test board and the data logger and functions to organize and shorten the thermocouple wires.

In one aspect, the link has multiple input ports for connecting to multiple temperature sensors (e.g., thermocouples). The link connects the multiple input ports to a single cable for easy attachment to a container housing a data logger. The link may also include other temperature sensors, such as a mass sensor of known weight and/or one or more ambient temperature sensors. The data lines from these additional sensors are also integrated into the single cable for transferring data to the data logger. The data logger stores the temperature information obtained from the sensor link. The temperature information may be downloaded from the data logger to a computer for further profiling analysis of the conveyor oven.

The test board has multiple temperature sensors strategically placed on its surface for temperature analysis. Typically, each temperature sensor is associated with a pair of signal conductors. The signal conductors from the temperature sensors are removably coupled to input ports on the sensor link by a plug/receptacle combination. The sensor link has internal wiring to route temperature information from the signal conductors to the single cable.

A container houses the data logger and provides a thermal barrier to protect the data logger from the extreme heat of the oven. The container has an input port for receiving the cable from the sensor link and acts as an adapter to electrically couple the cable to the data logger (data loggers typically have multiple input ports and cannot connect to a single cable). Specifically, the container divides and directs the multiple conductors in the cable to corresponding multiple output ports—typically, one output port for each temperature sensor. The output ports of the container mate with the data logger so that the two can be plugged together. Thus, the data logger is electrically coupled through the container, cable, and sensor link to the temperature sensors. For data loggers designed to receive a cable that provides data from multiple temperature sensors, the output ports on the container are not needed as the cable can directly plug into the data logger.

In another aspect, the sensor link physically attaches to the test PCB and is integrated with a container that houses the data logger. The sensor link may still have a single cable that extends from the sensor link to the container. In such a case, the sensor link may be removably attachable to the container. When the sensor link is attached to the container, the single cable is folded into a cavity on the container. When the sensor link is detached from the container, the sensor link is attached to the test PCB and the container is spaced apart from the test PCB, so as not to absorb heat and affect temperature profiling information associated with the test PCB. Alternatively, the sensor link may be integrated with the container and have multiple conductors passing the thermocouple information to the container so that the single cable is not used.

Whether or not a single cable is used, the sensor link may include one or more additional sensors to provide further profiling information. For example, the sensor link may include a metal mass of known weight. A temperature sensor is positioned on the surface of or within the metal mass for sensing the temperature of the metal mass. Temperature information obtained from this temperature sensor is hard-wired to the output port of the sensor link so that such temperature information may be routed to the data logger. An ambient temperature sensor may also be included on the sensor link and hardwired to the output port in a similar fashion.

In yet another aspect of the invention, a position sensor mounted to the sensor link senses position of the sensor link within the oven. For example, a reed switch may be actuated when the sensor link passes a magnet or magnets mounted to the oven. Thus, accurate position data and conveyor speed can be calculated.

Accordingly, the present invention provides a sensor link for easily transferring signals from two or more temperature sensors located on a test board to a data logger so that the data signals can be used to analyze conveyor oven performance. The sensor link is attachable and detachable from the test board so that it can be reused on multiple test boards and in different conveyor oven environments.

Various advantages and features of novelty that characterize the invention are particularized in the claims forming a part hereof. However, for a better understanding of the invention and its advantages, refer to the drawings and the accompanying description in which there are illustrated embodiments of the invention.

DETAILED DESCRIPTION

Figure 1:
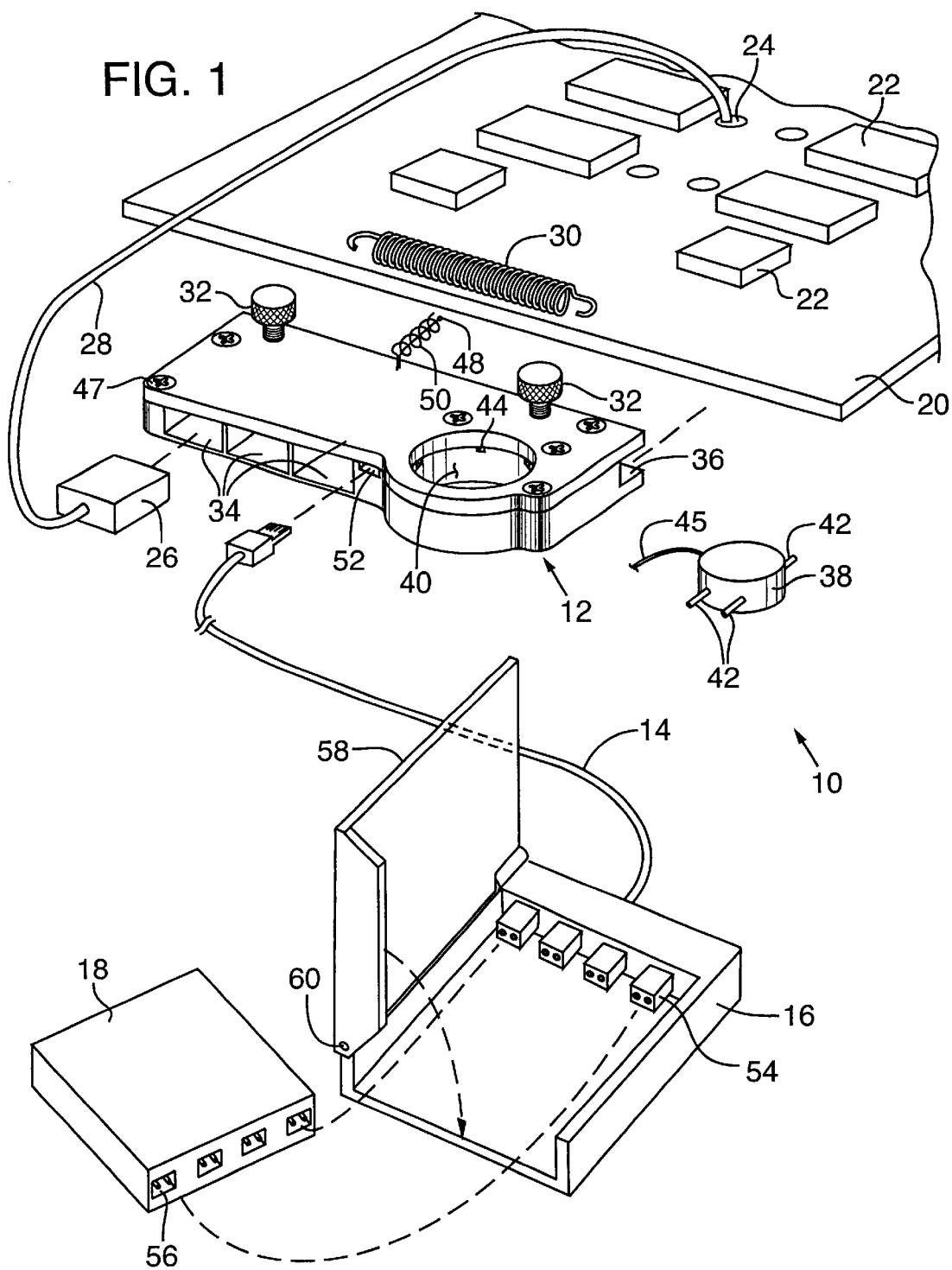
FIG. 1 is an exploded perspective view of a system according to the invention for sensing and collecting physical parameters associated with a conveyor oven, including a sensor link on a test board for coupling multiple sensors to a remote data logger.

FIG. 1 shows a system 10 for analyzing oven conditions according to an embodiment of the invention. The illustrated system 10 includes a sensor link 12, a cable 14, a container 16, and a data logger 18. The sensor link 12 connects to a test board 20 having multiple electronic components 22 (e.g., integrated circuits) positioned thereon. Additionally, the test board 20 has multiple temperature sensors, such as sensor 24. The illustrated temperature sensor is a thermocouple that includes two dissimilar metallic conductors welded together at their ends. Such thermocouples produce a voltage signal proportional to their temperature, as is well understood in the art. The temperature sensors are located at different positions on the test board 20. For example, the temperature sensors may be located on or near a cold point (a point that heats slowly), a hot point (a point that heats quickly), and/or a sensitive temperature point on the test board. The position and number of sensors used vary based on the particular test board, application, and desired data. Opposite the end where the temperature sensor connects to the test board, the sensor includes a plug, such as plug 26, for connecting to the sensor link 12. The sensor conductors or wires 28 may be threaded through an organizer and strain relief spring 30, ideally located on the top surface of the sensor link (see FIG. 5), and connected to a threaded portion of opposing clamp screws 32 (described further below).

A sensor link is a device with multiple input ports for attaching to multiple temperature sensors from the test board. Thus, the sensor link is a device that is positioned intermediate the test PCB and a data logger and electrically couples the two together so that long thermocouple wires from the test board to the data logger are not needed. As further described below, the sensor link may integrate or combine the wires from two or more of the multiple temperature sensors into an output connector for connection to a cable. Although the sensor link may have more than one output cable, one or more of the output connectors includes at least enough conductors to transmit signals from two or more temperature sensors through a single cable. The illustrated sensor link 12 includes multiple input ports 34 for receiving plugs 26 associated with the temperature sensors. A slot 36 extends the length of the sensor link 12. The slot 36 is sized such that it can receive the test board 20 in a tongue-and-groove fashion, yet is big enough to accept test boards of varying thickness. Clamp screws 32 may be screwed to releasably secure test boards 20 of different thicknesses in the slot 36. A wide variety of techniques can be used to connect the sensor link 12 to the test board 20 and the slot/clamps are only one such technique. For example, the sensor link may include one or more clips for securing itself to the test board. Alternatively, the test board may have screw holes therein for directly mounting the sensor link to the test board.

Additional sensors, such as mass 38, may be located on the sensor link to detect other oven parameters. The mass 38 may be mounted in a hole, shown generally at 40, extending through the sensor link. Supporting rods 42 extend outwardly from the mass 38 and are secured within small grooves 44 (also see FIG. 3) in the sensor link 12. The rods 42 are spaced about the periphery of the metal mass in any manner that allows effective suspension of the metal mass. For detecting the temperature of the mass 38, a cavity (not shown) may be centrally located therein with a temperature sensor, such as a thermocouple 45, secured within the cavity by a conductive paste (not shown). The cover 46 (FIG. 3) secures the rods 42 (and consequently the mass sensor) in place within the grooves. Screws 47 secure the cover in place. Although the mass is secured to the sensor link with supporting rods, other techniques can be used for such securing. Regardless of the technique used to mount the mass, it is desirable to thermally isolate the mass from the sensor link.

One or more mass sensors are used to detect the oven's ability to heat a metal mass by measuring the change in temperature of the mass at different points in the oven. Sensing the change in temperature of the metal mass allows for a determination of the oven's ability to heat an object, which is related to both airflow and temperature. Almost any metal of high specific heat can be used for the metal mass 38. For example, the metal mass 38 can be formed of aluminum, brass, stainless steel, steel, copper, etc. Additionally, non-metals with a high-specific heat can be used (e.g., polytetrafluoroethylene). The supporting rods are formed from a metal that has low thermal conductivity, such as stainless steel, to thermally isolate the metal mass 38 from the sensor link, but other metals can be used. As shown, the metal mass is disc-shaped, but other shapes (e.g., spheres, squares, etc.) can also be used, but the thermal impact on the sensor should be taken into account. Additionally, the metal mass is preferably sized so that it does not reach the ambient temperature of the oven as the sensor link 12 passes therethrough. Although only one metal mass is shown, additional metal masses may be added to the sensor link.

An ambient air temperature sensor 48 is positioned near the top surface of the sensor link 12. A coil spring 50 is attached to the sensor link 12 and extends outwardly therefrom. The spring 50 supports and protects the ambient air temperature sensor 48 and holds the sensor away from the sensor link 12 for measuring the temperature of the conveyor oven. There are numerous techniques for mounting the ambient temperature sensor 48 to the sensor link, and use of the spring 50 is only one example.

Figure 5:
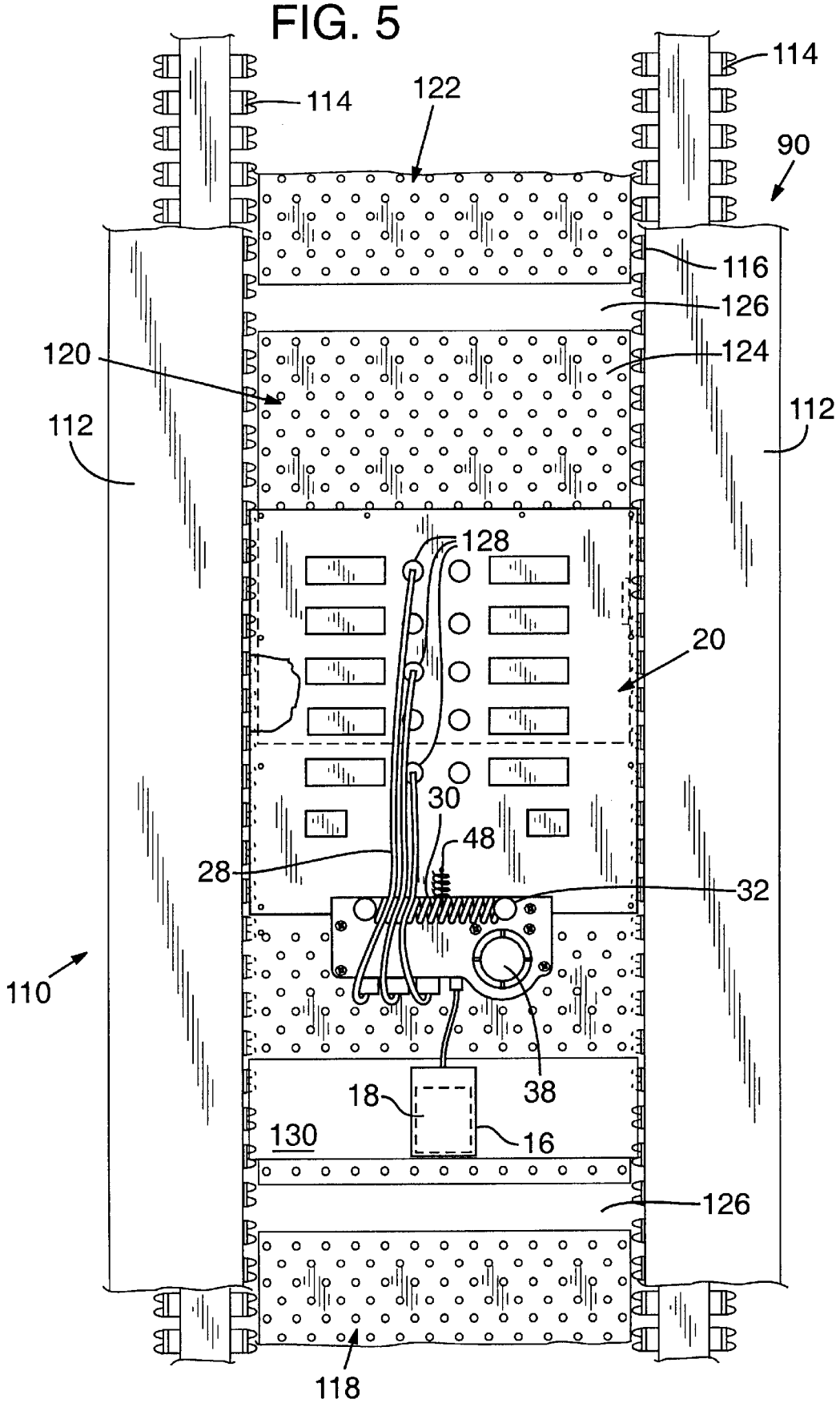
FIG. 5 shows a top-plan view of the system of FIG. 1 assembled on the test board and separate support member in a conveyor oven.

An output port 52 is used to connect the cable 14 from the sensor link 12 on the test board 20 to the container 16 on a separate, remote support member 130 (see FIG. 5). The cable 14 includes the necessary conductor wires to transmit signals from the sensors. In the case where the sensors are thermocouples, the cable includes multiple pairs of thermocouple wires. Specifically, each pair of thermocouple wires is associated with a sensor on the test board 20 or on the sensor link 12. The container 16 has electrical connections (not shown) to route each thermocouple pair to separate female receptacles 54. Male plugs 56 in the data logger 18 mate with female receptacles 54 to conductively connect the data logger 18 to the container 16. A hinged lid 58 rotates about hinges 60 to a closed position (see FIG. 5) to secure the data logger 18 within the container 16. In its operative position, the data logger 18 records the temperature sensor information by sampling (e.g., every 100 ms) the information received in the input receptacles 56.

Figure 2:
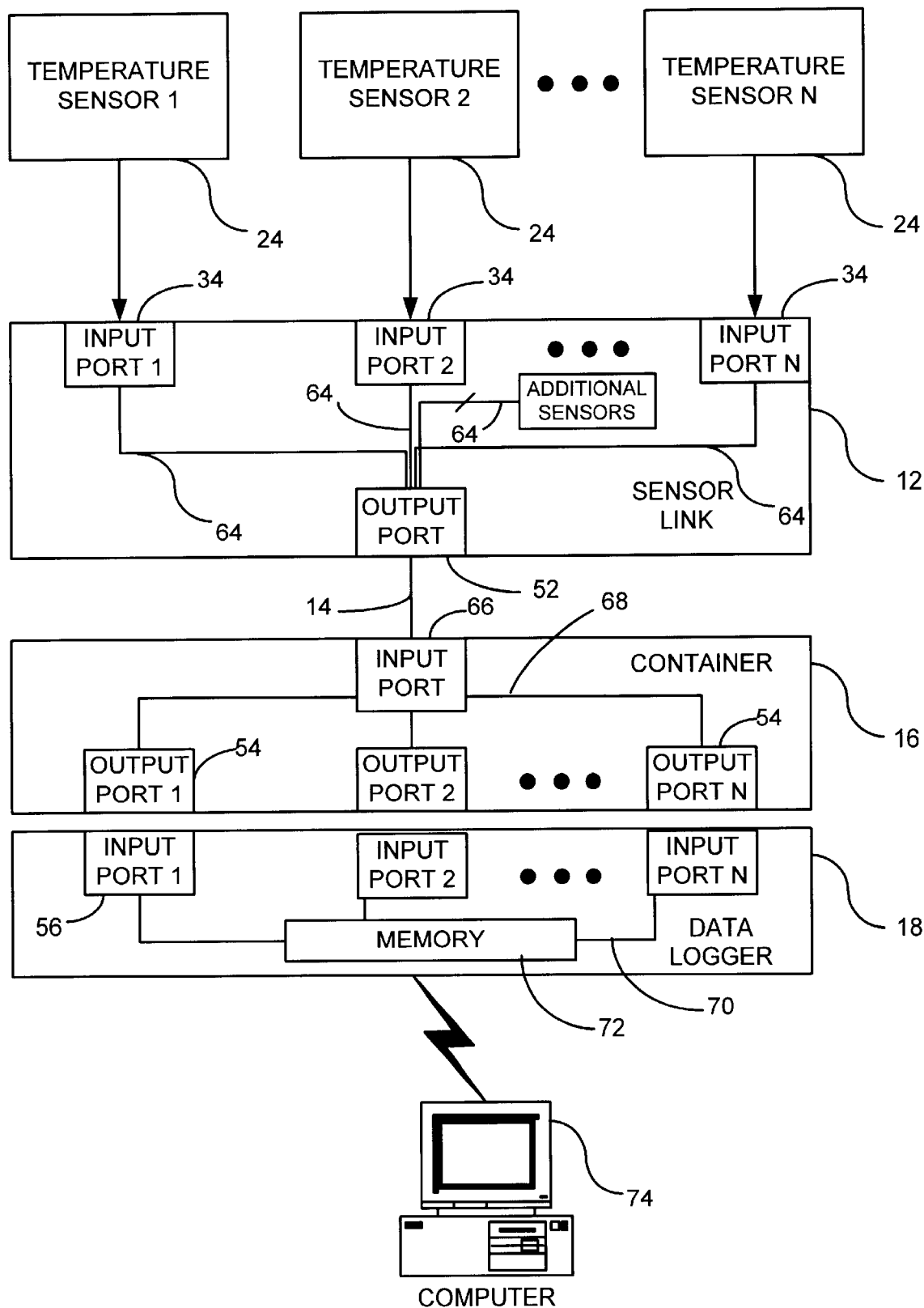
FIG. 2 is an overall block diagram of a conveyor oven profiler illustrating the electrical connections from the sensors of the test board to a computer that determines an oven profile.

FIG. 2 shows an electrical diagram of the system 10. The system is structured such that the data logger 18 reads and stores temperature information from temperature sensors 24. Any desired number N of temperature sensors may be used. The temperature sensors 24 are coupled to input ports 34 on the sensor link 12. Conductors 64 within the sensor link are coupled at one end to the input ports 34 and at an opposite end to the output port 52. Conductors 64 also couple the additional sensors located on the sensor link (e.g., the mass sensor) to the output port 52. As a result, the multiple conductors from the sensors are integrated into a single cable 14. The cable 14 connects to the container 16 at input port 66. The electrical wiring of the container 16 is such that wires in the cable 14 are separately routed to the output ports (e.g., female receptacles 54) on the container 16 as shown by conductors 68. The data logger has multiple input ports (e.g., male plugs 56) that have conductors 70 extending to a memory 72 or other storage device. The memory 72 or other storage device is part of the data logger itself, and is contained within container 18. The data logger 18 can download (e.g., by infrared link, cable, RF, etc.) the information stored in memory 72 to a computer 74 for analysis. The data can then be used for statistical process control (SPC). Statistical process control focuses on whether an overall process is performing properly, rather than on whether any particular product is within specification, as is well-known in the art.

Figure 3:
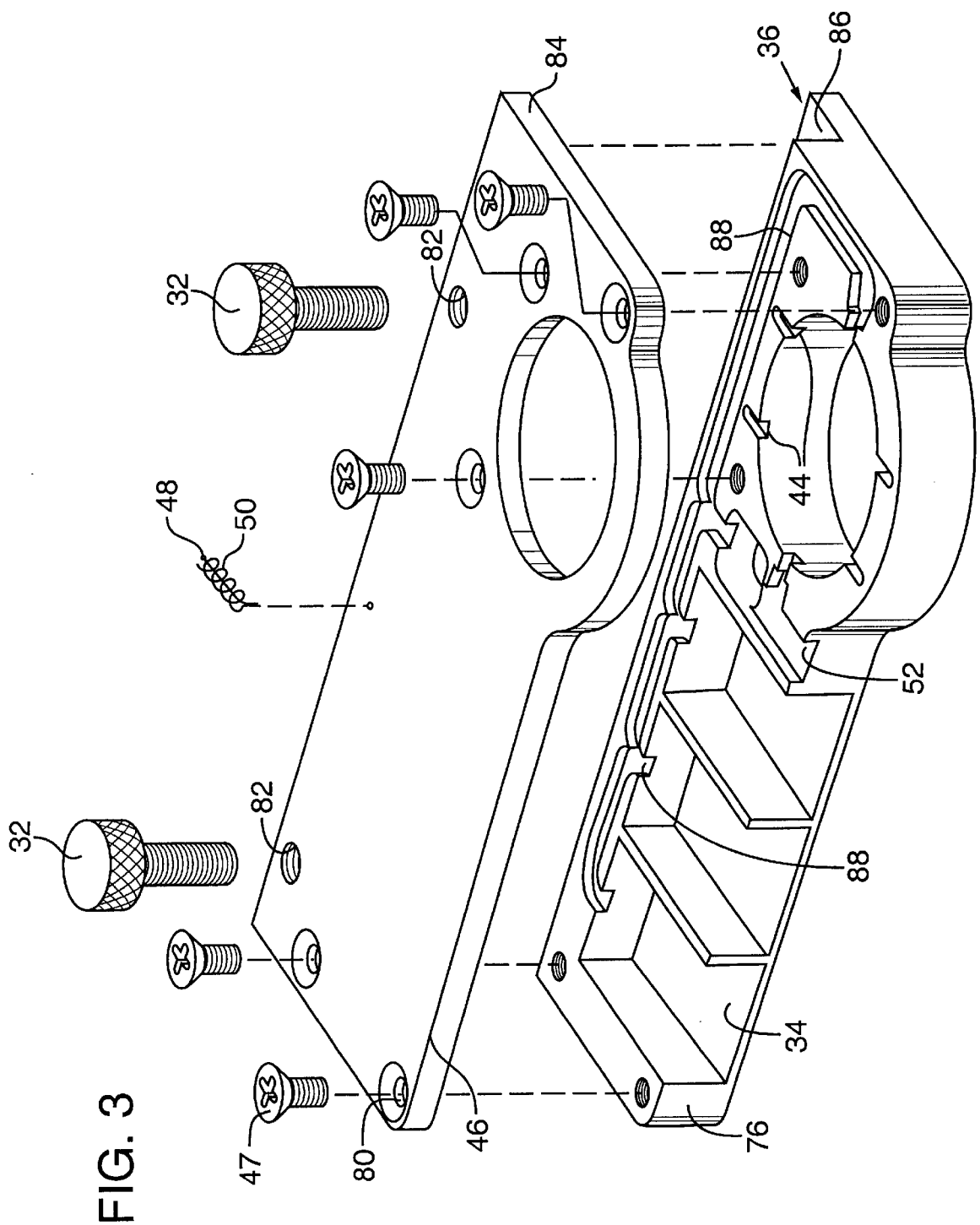
FIG. 3 is an exploded perspective view of the sensor link.

FIG. 3 shows the outer housing of the sensor link 12 in more detail. A cover 46 and a base 76 are removably attached by fasteners 47, ideally threaded into the base through countersunk holes 80 in the cover. Fasteners 47 may be screws, bolts, or other suitably sized means for connecting the cover and base. Alternatively, the cover 46 and the base 76 may be a monolithic structure or attached using permanent fasteners, such as a glue or weld. Threaded holes 82 extending through the cover may receive one or more clamp screws 32 (e.g., thumbscrews). The clamp screws 32 are shown as large screws that are tightened to secure the test board 20 (FIG. 1) within slot 36. Slot 36 is formed by an overhanging edge 84 of cover 46 and a lengthwise cutaway 86 in the base 76. Base 76 has channels 88 for running signal conductors (not shown) from the input ports 34 and sensors on the sensor link 12 to the output port 52.

Figure 4:
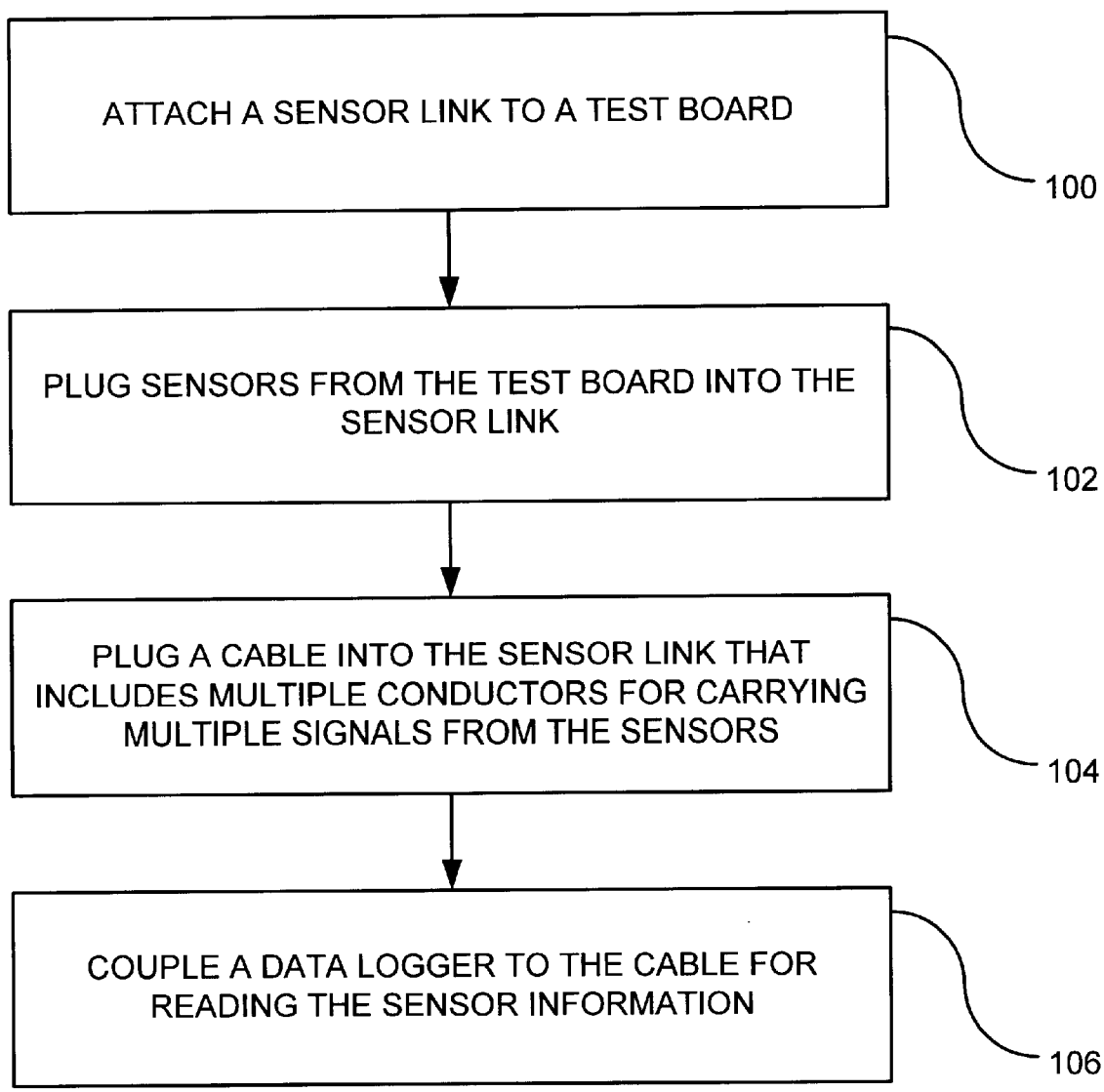
FIG. 4 is a flowchart of a method for connecting sensors from a test board to a data logger.

FIG. 4 shows a flowchart of a method for profiling a conveyor oven using a sensor link. In process block 100, the sensor link 12 is attached to a test board 20. For example, in the embodiment shown in FIG. 1, the test board 20 is inserted into slot 36 of the sensor link 12 and clamp screws 32 are tightened to secure the sensor link to the test board. In process block 102, sensors from the test board are connected to the sensor link. For example, returning to FIG. 1, the plugs 26 connected to the sensors are inserted into the input ports 34 on the sensor link 12. In process block 104, a conductor cable is attached to the sensor link 12. The cable contains wires for transferring the signals from multiple sensors on the test board and sensors on the sensor link to the container on the separate support member 130. For example, in FIG. 1, the cable 14 transfers signals from the sensor link 12 to the container 16. Thus, multiple sensor wires are contained in a single cable to simplify connection of the system. Use of the cable avoids having to connect the sensors directly to the remote data logger, which can result in an entanglement of long wires. In process block 106, the data logger is coupled to the cable to read the sensor information. For example, in FIG. 1, the data logger 18 plugs into the container 16 and the cable 14 is connected to the container. In alternative embodiments, the cable can plug directly into the data logger.

FIG. 5 shows a top plan view of the system, including the sensor link in its operative position assembled on the test board 20 passing through a portion of a known conveyor oven 110 (with the top of the conveyor oven removed for illustration). The container 16 contains data logger 18 mounted on the separate support member 130 in the conveyor oven. The support member is spaced from the test board, but the container and sensor link are mechanically and electrically interconnected by conductor cable 14. Although any conveyor oven may be used, the illustrated conveyor oven 110 includes opposing side rails 112 that cover opposing linked conveyor chains 114. The linked chains 114 are driven by a suitable motor (not shown). The links in the chains, such as link 116, project a sufficient distance beyond the rails 112 so that the test board 20 can rest thereon. The test board 20 rides on the linked chains as it is carried through the conveyor oven. The conveyor oven 110 includes a plurality of different temperature zones, as indicated generally at 118, 120 and 122. Although only three temperature zones are shown, the ovens usually have additional temperature zones. Each temperature zone includes a perforated metal plate, such as metal plate 124 in zone 120, having a grid of air holes formed therein. The air holes in the metal plate 124 are used to deliver air maintained at a desired temperature into the temperature zone. Exhaust ports 126 are formed by gaps between the zones. A fan (not shown) sucks air through the exhaust ports and recirculates the air by delivering it through the grid of holes in the metal plates. Sucking air through the exhaust ports effectively creates an air curtain between the temperature zones, allowing the zones to be maintained at different temperatures. In other words, the generated air curtains thermally isolate the zones from one another.

The sensor link 12 is connected to the test board 20 using clamp screws 32 as already described. The ambient temperature sensor 48 projects partially over the test board to sense oven temperature as the test board passes through the conveyor oven. Three temperature sensors 128 are positioned at different points of the test board 20. Although the location of the temperature sensors varies based on the desired testing, one possibility is to have a temperature sensor on a hot point (low mass), a cold point (high mass), and a sensitive point (a point that is of particular concern). The illustrated temperature sensors are thermocouples with thermocouple plugs 26 plugged into the input ports 34 on the sensor link 12. The thermocouple wires 28 are secured in spring 30 for strain relief and general organization. Mass 38 is positioned within hole 40 to sense the ovens ability to heat a mass. The sensor information is passed through cable 14 to the container 16 positioned on a support member 130. The container 16 provides a thermal barrier to protect the data logger 18 mounted therein.

Figure 6A:
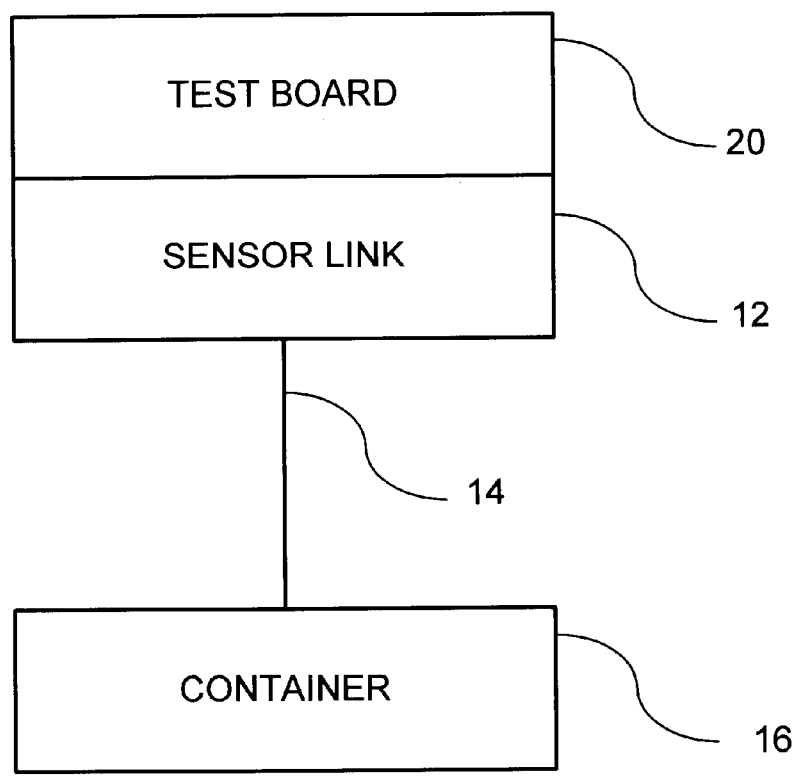
FIGS. 6A and 6B show schematic views of several embodiments of the system.

FIG. 6A shows a schematic diagram of the system 10. As already described, the sensor link 12 is electrically and mechanically attached to a test board 20 by any suitable connection scheme. The sensor link 12 also is electrically and mechanically connected to the container 16 (and consequently the data logger) via cable 14.

Figure 6B:
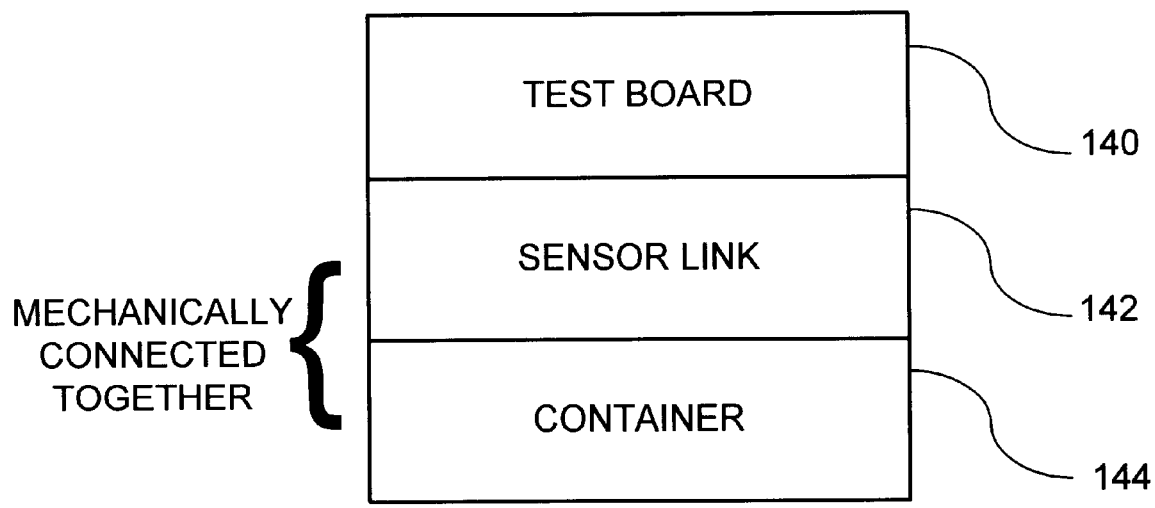

FIG. 6B shows an alternative embodiment where the sensor link 142 and container 144 are mechanically connected (i.e., integrated) together. In this embodiment, there may still be a single cable connecting the sensor link to the container. In such a case, the cable is folded into a cavity (not shown) within the container. The sensor link may be removably attached to the container to convert the connection scheme of FIG. 6B to that of FIG. 6A. Alternatively, the sensor link may be permanently integrated with the container without the need for the single cable. In such a case, the combined sensor link/container mechanically connects to the test board 140 and provides an intermediate device that allows for an electrical connection between sensors on the test board and the data logger stored within the container. Thus, multiple conductors—one for each temperature sensor—extend between the sensor link and the container.

Having described and illustrated the principles of our invention with reference to preferred embodiments thereof, it will be apparent that these embodiments can be modified in arrangement and detail without departing from the principles of the invention.

For example, although a particular conveyor oven is illustrated, virtually any type of conveyor oven may be used.

Additionally, although additional sensors are illustrated as being on the sensor link, such sensors are optional.

Still further, although one embodiment of the sensor link combines all of the temperature sensors into a single cable, not every sensor necessarily needs to be connected to the cable.

Yet still further, although a particular configuration of plugs and receptacles are shown, either side of the mating pair may be reversed, such that male plugs are switched to females and vice versa.

Although not shown, the sensor link may also contain a position sensor. The position sensor is used to detect the position of the sensor link as it passes through the conveyor oven. Such position information is stored within the electronic data logger 18. The position sensor may be a reed switch that is activated in response to a magnetic field. Magnets may be mounted within the conveyor oven at predetermined positions along the conveyor path. As the PCB passes the magnets in its travel through the oven, the position sensor is activated.

In view of the wide variety of embodiments to which the principles of our invention can be applied, it should be apparent that the detailed embodiments are illustrative only and should not be taken as limiting the scope of my invention. Rather, we claim as our invention all such modifications as may come within the scope of the following claims and equivalence thereto.

We claim:

1. In combination, multiple temperature sensors and a sensor link used for obtaining temperature information from temperature sensors in a conveyor oven environment, the sensor link comprising:

an outer housing;

a metal mass of known weight mounted to the outer housing and a thermocouple within or adjacent to the known mass for measuring the temperature of the known mass;

a plurality of input ports positioned within the outer housing that are designed to receive input plugs from the multiple temperature sensors external to the outer housing; and multiple conductors within the outer housing, the conductors extending from the plurality of input ports to an output port, the output port combining the input ports such that, when connected, two or more of the temperature sensors are readable from the output port.

2. The sensor link of claim 1 further including an ambient temperature sensor coupled to the outer housing and a conductor within the outer housing extending from the ambient temperature sensor to the output port for combining the ambient temperature sensor with the input ports such that the external temperature sensors and the ambient temperature sensor are readable from the output port.

3. The sensor link of claim 1 further including a test board having the multiple temperature sensors thereon and wherein the outer housing is attachable to the test board.

4. The sensor link of claim 1 further including clamps attached to the outer housing for attaching the outer housing to the test board.

5. The sensor link of claim 1 further including at least one position sensor mounted to the outer housing that is activated in response to passing predetermined positions within the conveyor oven environment.

6. A system for obtaining temperature information from temperature sensors in a conveyor oven environment, comprising:

a sensor link having multiple input ports and an output port, the multiple input ports for coupling to multiple temperature sensors on a test board, the output port combining conductors extending from the multiple input ports such that the multiple temperature sensors can be read from the output port;

a cable having one end plugged into the output port on the sensor link, the cable including sufficient conductors to separately carry temperature information from the temperature sensors on the test board;

a container having an exterior casing with a cavity therein, the exterior casing providing a thermal barrier to the cavity; and a data logger stored within the cavity of the container and coupled to an opposed end of the cable for reading and storing temperature information, from the temperature sensors, passed through the cable.

7. The system of claim 6 wherein the container includes a container input port directly connected to the opposed end of the cable and an adapter having conductors connected to the container input port, the adapter having plugs that allow the data logger to plug into the adapter for coupling the data logger to the opposed end of the cable.

8. The system of claim 6 wherein the sensor link further includes an outer housing and a metal mass of known weight mounted to the housing but thermally isolated therefrom.

9. The system of claim 6 wherein the sensor link further includes an outer housing with an ambient temperature sensor mounted to the housing but thermally isolated therefrom.

10. The system of claim 6 further including the test board having the multiple temperature sensors attached thereon and wherein the sensor link includes a slot extending along its length, the test board fitting within the slot of the sensor link for securing the sensor link to the test board.

11. The system of claim 10 further including clamps coupled to the sensor link for securing the test board within the slot of the sensor link.

12. The system of claim 6 further including:

a sensor organizer connected to the sensor link;

the test board having the multiple temperature sensors attached thereon; and wherein the sensor organizer holds wires associated with the temperature sensors to the sensor link.

13. The system of claim 12 wherein the sensor organizer comprises a coiled spring attached to the surface of the sensor link.

14. The system of claim 6 further including a metal mass of known weight having a thermocouple positioned adjacent to or within the metal mass, wherein the sensor link includes a hole extending therethrough and wherein the mass is suspended in the hole by pins having a low thermal conductivity.

15. The system of claim 6 wherein the data logger records temperature information associated with the temperature sensors and further including a computer that receives the temperature information from the data logger for preparing a profile of the oven.

16. The system of claim 6 further including at least one position sensor mounted on the sensor link and that is activated in response to passing predetermined positions within the conveyor oven environment.

17. A method of capturing temperature information used in profiling a conveyor oven, comprising:

(a) connecting ends of a plurality of temperature sensors to a test board;

(b) attaching a sensor link to the test board, the sensor link having at least one metal mass connected to an associated one of the temperature sensors, multiple input ports and at least one output port;

(c) connecting opposed ends of the plurality of temperature sensors to the sensor link;

(d) connecting a single cable between the sensor link and a data logger or a container having a data logger mounted therein; and (e) passing the test board, sensor link, and data logger through a conveyor oven.

18. The method of claim 17 further comprising storing temperature information obtained from the temperature sensors in the data logger.

19. The method of claim 17 further including reading, in the data logger, temperature information from the temperature sensor associated with the metal mass.

20. The method of claim 17 further including:

(a) reading data from the temperature sensors and storing the data in the data logger;

(b) transferring the data from the data logger to a computer;

(c) utilizing the computer to prepare a profile of the oven characteristics.

21. A system for obtaining temperature information from temperature sensors in a conveyor oven environment, comprising:

means for connecting a housing to a test board;

means for connecting the housing to multiple temperature sensors positioned on the test board;

means for electrically connecting the multiple sensors to a single output port located within the housing; and means for electrically connecting a data logger to the single output port for reading and storing temperature information from the sensors on the test board.

22. The system of claim 21 further including sensing means located on the housing for sensing additional temperature parameters of the conveyor oven.

23. A system for obtaining temperature information from temperature sensors on a test board in a conveyor oven environment, comprising a sensor link that is removably and mechanically connectable to the test board and that is positioned intermediate the test board and a data logger, the sensor link having input ports to receive the multiple temperature sensors coupled to the test board and to electrically couple the temperature sensors on the test board to the data logger, and the sensor link defining a recess dimensioned to receive a thermal mass.

24. The system of claim 23 further including a container that houses the data logger, the container being integrated with the sensor link.

* * * * *

UNITED STATES PATENT AND TRADEMARK OFFICE
CERTIFICATE OF CORRECTION

PATENT NO. : 6,511,223 B1
DATED : January 28, 2003
INVENTOR(S) : Paul M. Austen and Rex L. Breunsbach It is certified that error appears in the above-identified patent and that said Letters Patent is hereby corrected as shown below:

<u>Title page,</u>
Item [56], References Cited, OTHER PUBLICATIONS, "O'Rourke, H. T."; reference, "S-145" should read -- S-145 through S-148 --.

Signed and Sealed this

Eleventh Day of November, 2003

JAMES E. ROGAN
*Director of the United States Patent and Trademark Office*